US012069182B2

(12) United States Patent
Annam et al.

(10) Patent No.: US 12,069,182 B2
(45) Date of Patent: Aug. 20, 2024

(54) CHECKOUT WITH MAC

(71) Applicant: VISA INTERNATIONAL SERVICE ASSOCIATION, San Francisco, CA (US)

(72) Inventors: Hari Krishna Annam, Sunnyvale, CA (US); Selva Ganesh Vasudevan, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 577 days.

(21) Appl. No.: 17/272,578

(22) PCT Filed: Sep. 12, 2018

(86) PCT No.: PCT/US2018/050707
§ 371 (c)(1),
(2) Date: Mar. 1, 2021

(87) PCT Pub. No.: WO2020/055401
PCT Pub. Date: Mar. 19, 2020

(65) Prior Publication Data
US 2021/0377039 A1    Dec. 2, 2021

(51) Int. Cl.
*H04L 9/32* (2006.01)
*G06Q 20/36* (2012.01)
(Continued)

(52) U.S. Cl.
CPC ......... *H04L 9/3242* (2013.01); *G06Q 20/363* (2013.01); *G06Q 20/3674* (2013.01);
(Continued)

(58) Field of Classification Search
CPC ... H04L 9/3242; H04L 9/0822; H04L 9/0825; H04L 9/088; H04L 9/14; H04L 9/3273;
(Continued)

(56) References Cited

U.S. PATENT DOCUMENTS 8,856,894 B1 * 10/2014  Dean ........................ H04L 9/32
726/5
2006/0020783 A1    1/2006  Fisher
(Continued)

FOREIGN PATENT DOCUMENTS

KR         101462964 B1    11/2014
WO    WO-2007048063 A2 *  4/2007   ....... G06Q 10/06375

OTHER PUBLICATIONS

International Search Report and Written Opinion of International Application No. PCT/US2018/050707, dated Feb. 5, 2019, 12 pages.

*Primary Examiner* — Khalid M Almaghayreh
(74) *Attorney, Agent, or Firm* — K&L Gates LLP (57) ABSTRACT

A system for protecting personal information uses a challenge and an encrypted copy of the challenge in the form of a message authentication code (MAC) to provide authentication among multiple parties. The challenge is received by a first party from a second party. The challenge is encrypted by the first party to form the MAC and then both the challenge and the MAC are returned to the second party. The second party authenticates the first party by confirming the challenge. The second party sends the MAC and challenge to the third party. The third party decrypts the MAC using a key shared with the first party. When the decrypted MAC matches the challenge, the first party is authenticated to the third party. The process is applicable to transaction processing to limit compromise of payment instrument details.

20 Claims, 5 Drawing Sheets

(51) Int. Cl.
*G06Q 20/38* (2012.01)
*G06Q 20/40* (2012.01)
*H04L 9/08* (2006.01)
*H04L 9/14* (2006.01)

(52) U.S. Cl.
CPC ....... *G06Q 20/3823* (2013.01); *G06Q 20/388* (2013.01); *G06Q 20/401* (2013.01); *H04L 9/0822* (2013.01); *H04L 9/0825* (2013.01); *H04L 9/088* (2013.01); *H04L 9/14* (2013.01); *H04L 9/3273* (2013.01); *G06Q 2220/00* (2013.01); *H04L 2209/46* (2013.01); *H04L 2209/56* (2013.01)

(58) Field of Classification Search
CPC . H04L 2209/46; H04L 2209/56; H04L 63/04; H04L 63/08; H04L 9/3271; G06Q 20/363; G06Q 20/3674; G06Q 20/3823; G06Q 20/388; G06Q 20/401; G06Q 2220/00
See application file for complete search history.

(56) References Cited

U.S. PATENT DOCUMENTS

| | | | |
|---|---|---|---|
| 2008/0189214 A1* | 8/2008 | Mueller | G06Q 20/20 705/72 |
| 2009/0222383 A1* | 9/2009 | Tato | G06Q 20/352 705/35 |
| 2012/0239928 A1* | 9/2012 | Judell | H04L 9/3271 713/168 |
| 2015/0310188 A1* | 10/2015 | Ford | H04L 63/101 726/28 |
| 2015/0348039 A1* | 12/2015 | Allen | G06Q 20/36 705/44 |
| 2016/0180343 A1* | 6/2016 | Poon | H04L 63/0861 705/44 |
| 2017/0142090 A1* | 5/2017 | Mahaffey | H04L 63/083 |
| 2017/0289120 A1* | 10/2017 | Kohli | H04L 63/08 |
| 2017/0317997 A1* | 11/2017 | Smith | H04L 9/14 |
| 2018/0191511 A1* | 7/2018 | Dottax | G06Q 20/382 |
| 2020/0057664 A1* | 2/2020 | Durham | G06F 21/53 |
| 2021/0160232 A1* | 5/2021 | Mahaffey | H04L 63/0869 |

* cited by examiner

CHECKOUT WITH MAC

CROSS-REFERENCE TO RELATED APPLICATIONS

This application is a national stage entry under 35 U.S.C. 371 of International Patent Application No. PCT/US18/50707, filed on Sep. 12, 2018, the entire contents of which are hereby incorporated by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Theft of payment instrument data is widespread and growing. Credit cards, debit cards, prepaid or reward cards are all at risk of being compromised through skimming or other mechanisms that intercept transactions between purchasers and merchants.

SUMMARY

Three-way authentication among three parties involves the use of challenge passphrases and encryption to ensure both that participants have an assurance of who they are dealing with as well as being able to perform transactions without exposing details of a user's selected payment instruments. A user device may receive a challenge from a merchant. The challenge is provided to a wallet application associated with a user. The wallet application uses a cryptographic key to encrypt the challenge to generate a message authentication code (MAC). The challenge and MAC may be provided to the merchant, which may then validate the challenge and establish that a live person is operating the user device. The challenge and MAC, transaction data, and in some embodiments additional information, may be passed from the merchant to a processor that decrypts the MAC to restore the original challenge. In some cases, a merchant acquirer or other intermediary may also handle the data being passed from the merchant to the processor. When the restored challenge matches the original challenge, the processor has an assurance that the request is coming from the authentic user. The processor may then retrieve personal account number (PAN) and add that information to the merchant transaction data so that the transaction may be approved by an issuer of the payment instrument. Once the authorization is received from the issuer, an approval for the transaction may be propagated back through the participants to the merchant and user. In this way, neither the merchant nor the merchant acquirer have access to the user's PAN data, even if the merchant site is compromised and skimming off transaction details to an unauthorized agent.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Any merchant or service provider may have their communication environment compromised so that whenever a personal account number (PAN) is provided, that information may be stolen. One of the most effective ways to prevent loss of PAN data to a hacker is to avoid providing the PAN to merchants and service providers. A system and method use cryptographic methods to perform a three-way authentication that allows a transaction processor to confirm a user's activity with a merchant and substitute a real user PAN after the transaction is received from the merchant, rather than from the merchant itself. By encrypting a nonce or challenge, the transaction processor (processor) is able to confirm the user's interaction with the merchant, the merchant is able to confirm human interaction with the merchant website, and the merchant is able to confirm the user interaction with the processor.

A user wallet acts as an intermediary to see that the processor and user, or technically the user device, have a shared limited use key (LUK) or a unique derived key (UDK) that is used to perform the necessary cryptographic verification for the PAN-free transaction processing.

Figure 1:
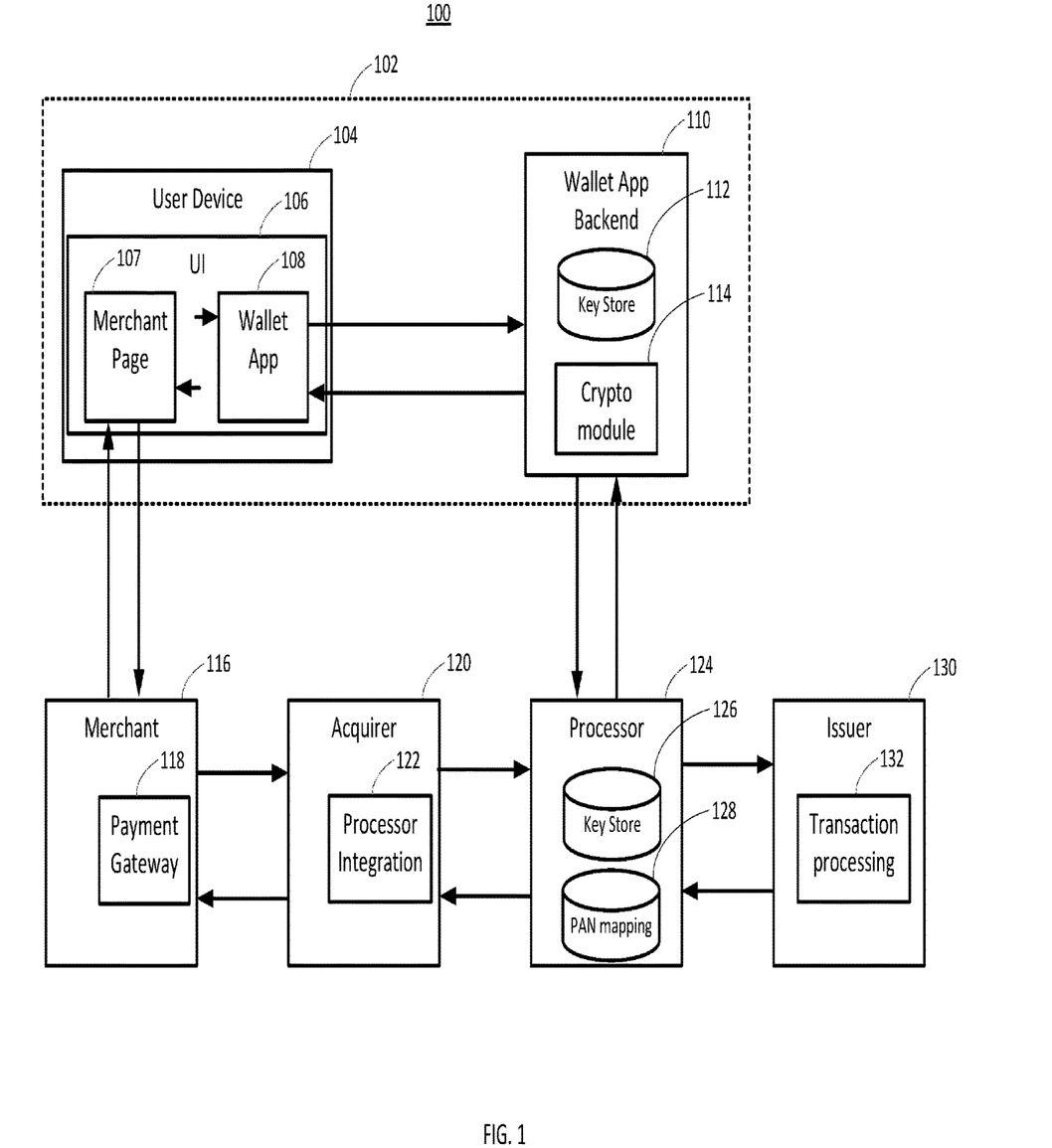
FIG. 1 is a system diagram illustrating a system for multi-party authentication in accordance with the current disclosure.

FIG. 1 is a system diagram illustrating a system 100 for multi-party authentication. Component elements of the system 100 may include a user system 102, sometimes referred to herein as a first party system. The user system 102 may include a user device 104 and a wallet backend 110. The user device may be any of a number of devices including a computer, a laptop, a tablet, a smartphone, or similar device capable of running an application and communication via a network. The user device 106 may include a processor and memory (not depicted for clarity) as well as a user interface 106. The user interface 104 may include a display and input device, such as a keyboard or touchscreen. The user interface 104 may include modules that support display of a merchant page 107 and a wallet application 108. For example, the user interface 106 may include support for a web browser that allows display of a merchant web page. The wallet application 108 may allow a user to store, manage, and use locally or remotely stored payment instrument data, such as credit cards, debit cards, rewards points, etc. The user interface 106 may allow a user to interact with applications stored on the user device 104 including the merchant page 107 and the wallet application 108.

The user system 102 may also include the wallet backend 110, in one embodiment. In this embodiment, the wallet backend 110 provides the actual storage for some elements used in the system 100. In particular, the wallet backend 110 may store keys in a secure manner, for example, in a key store 112. The wallet backend 110 may also store actual card details in the same secure manner. A cryptography module 114 may include processing for various aspects of secure computing including key generation, signing, signature verification, encryption, and decryption. The keys generated and/or stored may include public key infrastructure (PKI) public and private keys, certificates, and master symmetric keys, as well as derived keys for limited use or single use. Such single use keys may include unique derived keys (UDK). Key derivation techniques are well understood and beyond the scope of this disclosure and will not be discussed in more detail.

Other components of the system 100 may include a merchant system 116 that hosts web pages, product databases, and includes, or is coupled to, a payment gateway 118. An acquirer 120, also known as a merchant acquirer, captures payment data from the merchant's payment gateway 118 and performs tasks on behalf of the merchant to complete financial transactions. For example, the acquirer 120 may be the merchant's bank and may participate in settlement operations with user's issuing banks to transfer funds generated in a customer purchases into credits the merchant's bank account. As part of this process, the acquirer 120 may operate an integration module 122 that supports interactions with downstream financial processors, such as VISA®.

A processor 124 may act as a clearinghouse for transactions, for example, by routing transactions from an acquirer 120 to a card issuer 130. The processor 124 may also, in this illustrated system, act in concert with the wallet backend 110 to support financial transactions that are completed without the merchant system 116 ever handling the user's payment instrument details. To that end, the processor 124 may have a key store 126 that is a secure repository for PKI keys, master keys, derived keys, and key derivation algorithms. Additionally, the processor 124 may have a database of PAN data 128 that is used to inject actual card details into transaction data for use by an issuer 130 in approving or denying a transaction request. Finally, the issuer 130 may have a transaction processing module 132 that approves transaction requests and performs settlement on purchases, returns, credits, etc.

Briefly, in operation a purchase is made by the user at the user device 104, the wallet is used to fill in transaction details but no actual PAN information is included in the transaction information sent to the merchant. Instead, a challenge provided by the merchant is encrypted and returned to the merchant. The merchant submits both the clear and encrypted challenge which is ultimately received by the processor. The processor has knowledge of the user's keys and if the challenge decrypts with the user's key and matches the clear challenge, the user and merchant have been authenticated. The processor 124 may then substitute the user's actual PAN into the transaction information and submit the transaction to the issuer 130 for approval. After the issuer has approved the transaction, processing may follow a normal routine for approval and clearing.

Figure 2:
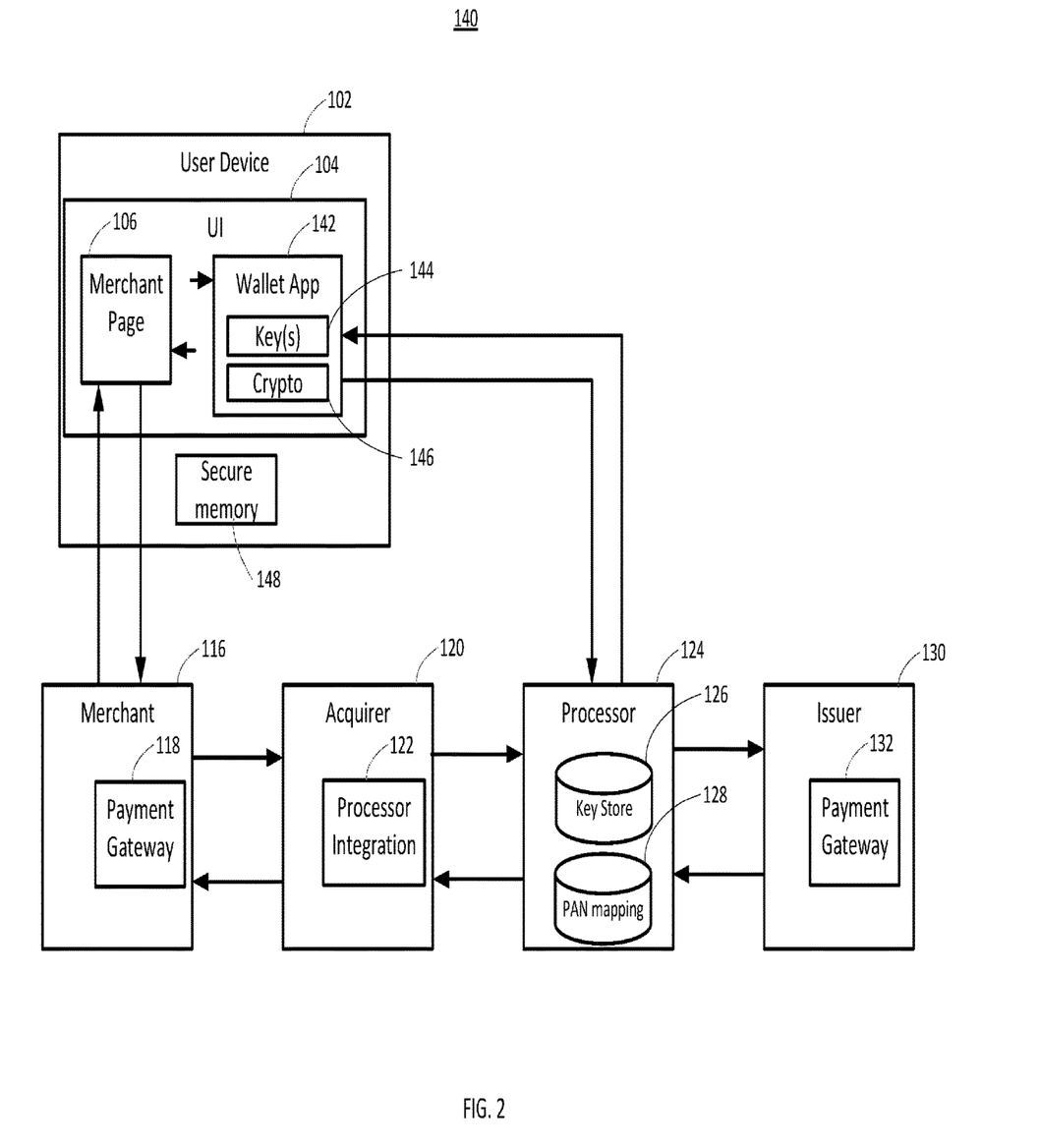
FIG. 2 is another system diagram illustrating a second configuration of the system of FIG. 1.

FIG. 2 is an illustration of an alternate embodiment of the system 100 shown in FIG. 1. In this illustration, a system 140 moves the functionality of the wallet backend 110 into the user device 104 in the form of increased functionality of a wallet application 142 compared to the wallet application 108 shown in FIG. 1. In this embodiment, the wallet application 142 may include both a key store 144 and sufficient cryptographic computing functionality 146 to generate derived keys and encrypt the merchant challenge. In such an embodiment, the wallet application 142 or a separate function of the user device 102 may include a secure, tamper-resistant memory 148 for storing master or secondary keys. In an embodiment, the secure memory 148 may be part of a secure element that may also include cryptographic functions. In operation, the steps outlined above and described in more detail below are similar in the two embodiments of FIGS. 1 and 2.

Figure 3:
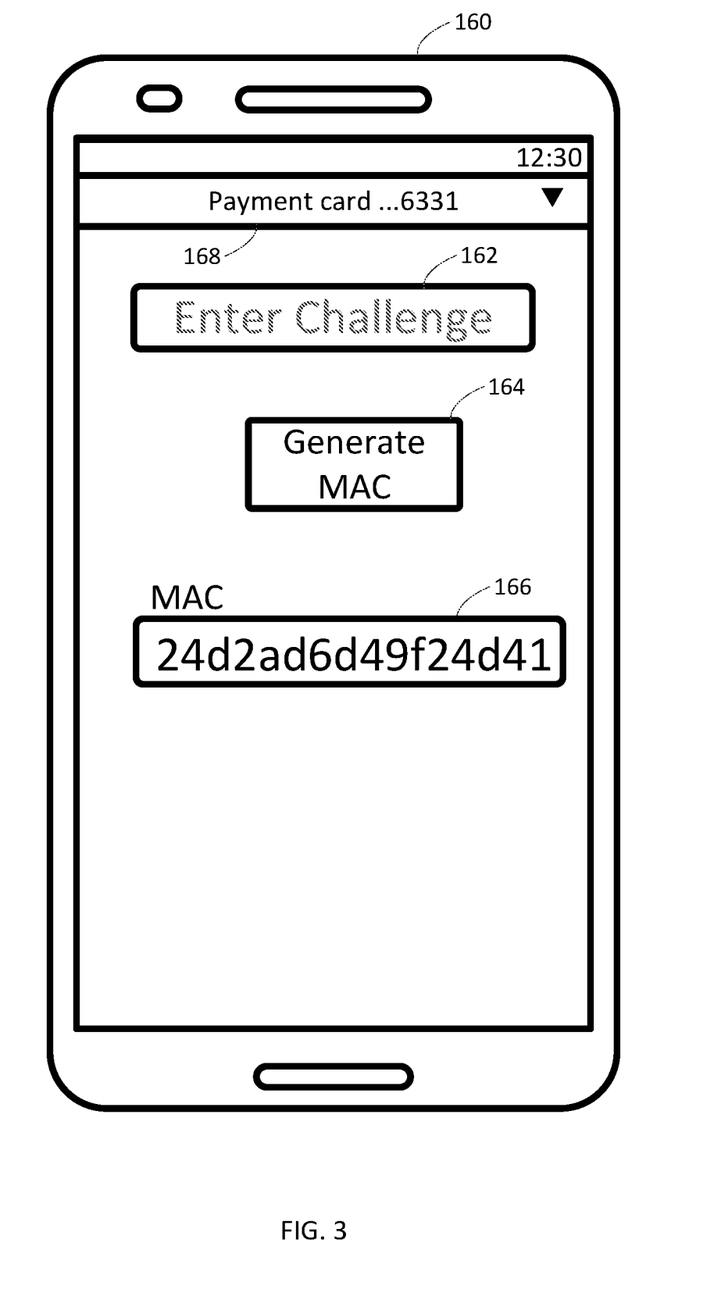
FIG. 3 is an illustration of a user device showing user interface of a wallet interaction.

FIG. 3 is an illustration of a user device 160 that may be the same or similar to the user device 108 of FIGS. 1 and 2. In this illustration, a user interface page for interaction with the wallet application may be illustrated. The user may enter the challenge from the merchant into the text box 162 and activate the button 164 to request generation of the message authentication code (MAC). The wallet application 108, for example, in the embodiment of FIG. 1 may communicate with the wallet backend 110 to send the challenge for encryption. The wallet backend 110 may return the MAC for display in text box 166. In an embodiment, the user may select a card from the wallet to designate for the transaction using drop-down box 168. In this case, a portion of the card number may be appended to the challenge prior to encryption for use by the processor 124 in completing the transaction details. In other embodiments, the card selection may be deferred as shown below.

Figure 4:
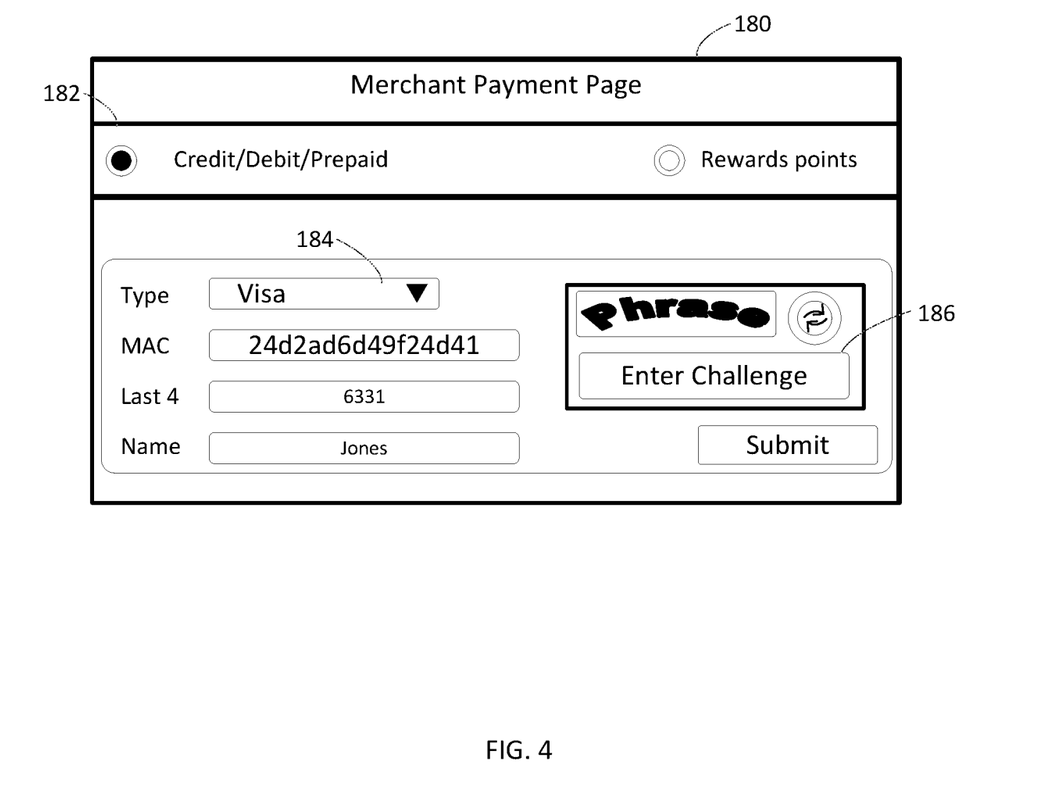
FIG. 4 is an illustration of a user interface of a client application running on the user device.

A merchant-side user interface 107 may be illustrated in FIG. 4. A user page 180 may include a selection window 182, when multiple choices for payment are available. The user page 180 may also include data entry boxes 184 for selection of a payment instrument, if not chosen already as described above. Other data entry boxes may allow entry of the MAC, and optionally, entry of the last four digits of the selected card and the user's last name. The MAC may be received from the wallet application 108 as described above related to FIG. 3. The latter two boxes of user information may reduce the time the processor 124 needs to identify the user and select the appropriate key for decryption of the MAC. A challenge window 186 may allow the user to see and enter the challenge. Such challenge entry fields are common and typically used to determine that a live person is interacting with the application rather than a computer imposter. One such challenge system is the "Captcha" system. After the user has entered the requested data, this substitute payment information may be submitted to the merchant system 116 for relaying to the acquirer 120 and ultimately to the processor 124.

In this process, the same challenge is used by both the merchant system 116 to determine the viability of the user as well as by the processor 124 to determine that the actual user was in possession of the challenge via the MAC. This dual use of the challenge allows the merchant to submit the transaction with no PAN details and allows the processor 124 to substitute the user's PAN information when the MAC successfully decrypts after the merchant and acquirer have handled the transaction.

Figure 5:
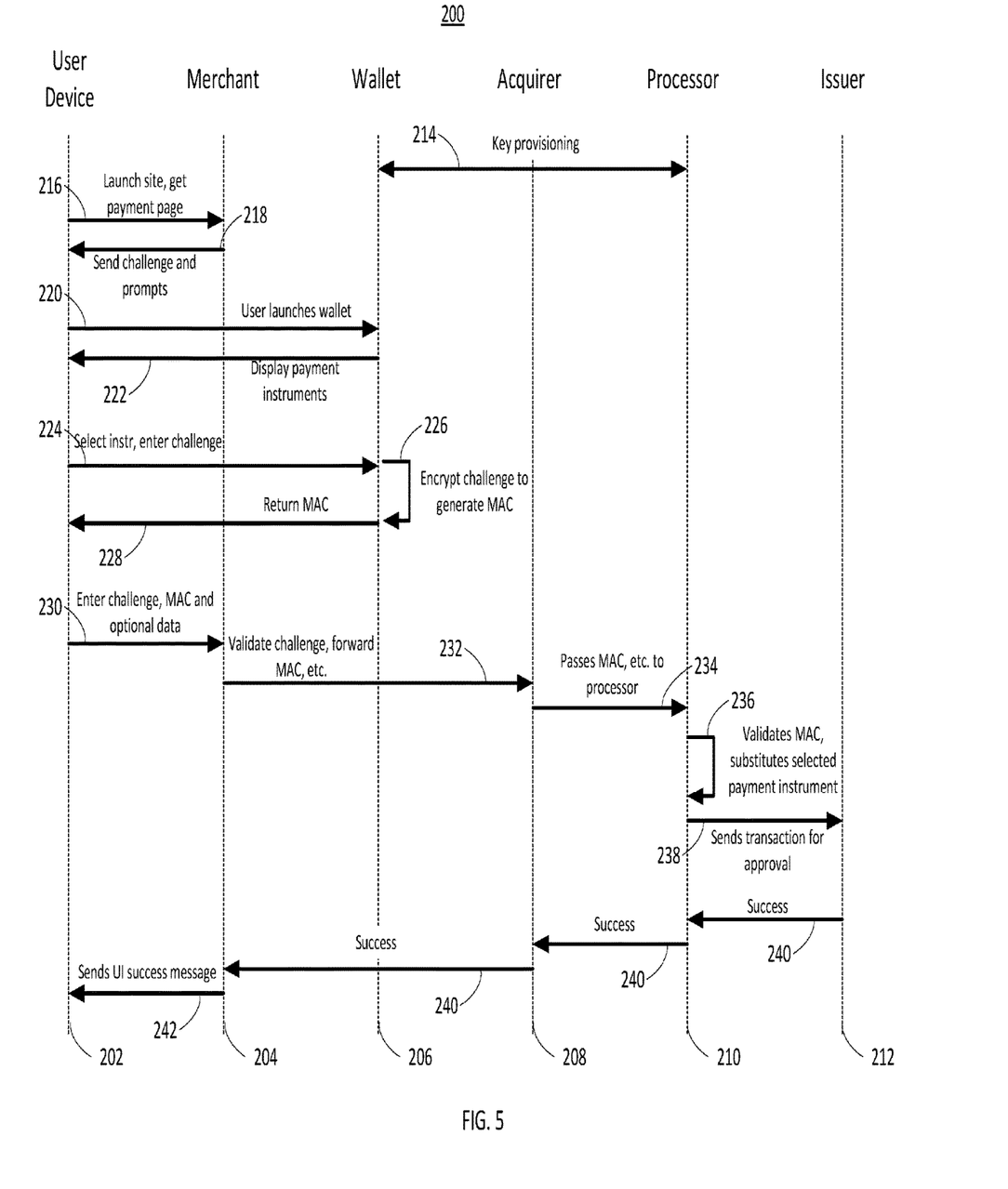
FIG. 5 is a sequence diagram illustrating a method of multi-party authentication in accordance with the current disclosure.

FIG. 5 is a sequence diagram illustrating a method 200 of multi-party authentication. The participants in the method 200 include the user device 202, the merchant 204, the wallet 206 (comprising the wallet application 108 and/or the wallet backend 110, based on the embodiment), the acquirer 208, the processor 210, and the issuer 212. Initially, at step 214, the wallet 206 and the processor 210 provision keys for future use. The key provisioning may be via the exchange of master keys for use in generating LUK/UDK keys for use with each transaction request. In other embodiments, the key provisioning may involve PKI key generation and certificate authentication by a certificate authority (not depicted). Once the keys are in place, execution may continue at step 216, the user device 202, under the control of a user, may interact with the merchant 204 to select an item or service for purchase. The merchant 204 may respond with a page similar to that of FIG. 4 displaying the challenge at step 218.

The user may then activate, if needed, the wallet application 108 and at step 220 send the request for a transaction to the wallet 206. The wallet 206 may respond with the screen shown in FIG. 3 displaying choices for payment at step 222. Then at step 224, user may enter the challenge into the text box, confirm a payment instrument selection and submit the information to the wallet 206.

At step 226, the wallet may determine, if needed, what processor is handling the transaction, and select or generate, as needed, a key. The key may be used to encrypt the challenge to create the message authentication code (MAC). Then the MAC and card selection confirmation may be returned to the user device 202 at step 228, as shown in FIG. 3 with the MAC data now displayed. The user may then return to the merchant page (FIG. 4) and enter the MAC and challenge at step 230. Additional data as needed may be entered as discussed above, such as the user last name and last four digits of the payment instrument. The entered information may be sent from the merchant 204 to the acquirer 208 at step 232. The acquirer 208 may continue processing, such as logging the merchant transaction for later clearing work and then forward at least some transaction details, the challenge, and the MAC to the processor 210 at step 234.

At step 236, the processor 210 may select or generate a key according to a key derivation plan agreed to at step 214 and use the key to decrypt the challenge. When the decrypted MAC contains a match for the challenge the user is validated and the transaction details are supplemented with the user's selected payment instrument PAN and presented to the issuer 212 for approval at step 238.

When the transaction is approved, or denied, the approval status is propagated back upstream at steps 240 to the merchant 204. At step 242, the merchant 204 sends a confirmation of the transaction to the user device 202, completing the transaction. The transaction is completed and the user's PAN is never divulged to the merchant 204 or acquirer 206. Unlike some payment systems such as PAYPAL®, the user does not have to log into the third party payment system during the transaction process, nor does the issuer need to be involved in the pre-registration of their cards for use in the payment system.

The technical effect of the described system is dual authentication with a single challenge for authenticating both the merchant using the clear form and the processor using the encrypted form of the challenge. This saves computing processing and network bandwidth by eliminating the back channel communication required by other payment systems.

Users, merchants, and issuers all benefit from use of the system and methods described. User's payment instrument data is safeguarded from theft. Merchants can process transactions without the potentially huge risk of compromising PAN data from its customer base thus avoiding the associated financial and reputation downsides of operating a hacked website. Issuers are protected from covering card holder losses when PAN data is compromised. In the end, all parties benefit from reduced risk and losses.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of multi-party authentication performed prior to performing a computer-based action on behalf of a first party using a shared challenge, the method comprising:
    receiving, at a first party, a challenge from a second party, wherein the first party stores a wallet application;
    storing, by the wallet application of the first party, a payment instrument for a payment transaction;
    encrypting the challenge with a first key of the first party to generate a message authentication code (MAC);
    providing, by the first party, the MAC and the challenge to the second party;
    confirming the challenge at the second party by matching the challenge sent to the first party with the challenge received from the first party;
    responsive to confirming the challenge, sending the MAC, the challenge, and transaction details associated with a purchase transaction from the second party to a third party;
    at the third party, decrypting the MAC using a second key of the first party to generate a decrypted challenge;
    authenticating the first party to the third party when the decrypted challenge matches the challenge;
    sending, to the second party from the third party, a confirmation of authentication of the first party responsive to the decrypted challenge matching the challenge;
    based on the confirmation of the authentication, selecting the payment instrument on the wallet application;
    responsive to confirming that the decrypted challenge matches the challenge, retrieving a personal account number (PAN) of the payment instrument of a user from a database and adding the PAN to the transaction details; and
    sending the transaction details from the third party to an issuer of the payment instrument for approval of the purchase transaction.

2. The method of claim 1, wherein encrypting the challenge with the first key comprises sending the challenge to a wallet account of the first party for encrypting with the first key of the first party.

3. The method of claim 1, wherein the first key and the second key have the same content.

4. The method of claim 3, wherein the first key is one of a limited use key or a one-time key.

5. The method of claim 3, wherein the first key and the second key are derived keys from a preselected master key.

6. The method of claim 1, wherein the first key is a private key of the first party and the second key is a public key of the first party.

7. The method of claim 1, wherein sending the MAC and the challenge from the second party to the third party comprises sending a personal identifier associated with the first party when sending the MAC and the challenge from the second party to the third party.

8. The method of claim 7, wherein sending the MAC and the challenge from the second party to the third party comprises sending a request for a transaction authorization with the MAC and the challenge.

9. The method of claim 8, wherein sending the confirmation of authentication from the third party to the second party comprises sending an approval corresponding to the request for the transaction authorization.

10. A system that performs multi-party authentication among participants in an electronic communication operation, the system comprising:
a first party system, the first party system including a first memory and a cryptographic module, the first party system operating to receive a challenge, perform a cryptographic function via the cryptographic module on the challenge to create a message authentication code (MAC), and return the MAC to a source of the challenge, wherein the first party system stores a wallet application, wherein the wallet application stores a payment instrument for a payment transaction;
a second party system functionally coupled to the first party system by a first network, the second party system including a challenge module that generates the challenge and verifies a response from the first party system, the response including the challenge, the MAC, and transaction details associated with a purchase transaction; and
a third party system functionally connected to the second party system by a second network, the third party system including a second cryptographic function, wherein the third party system is configured to:
select the payment instrument based on confirmation of an authentication of the challenge,
decrypt the MAC to generate a decrypted challenge;
responsive to confirming that the decrypted challenge matches the challenge, retrieve a personal account number (PAN) of the payment instrument of a user from a database and adding the PAN to the transaction details; and
send the transaction details to an issuer of the payment instrument for approval of the purchase transaction.

11. The system of claim 10, wherein the first party system includes an external data management function, the external data management function storing a first key and performing the cryptographic function to create the MAC.

12. The system of claim 10, wherein the first party system comprises a secure memory, the secure memory storing at least one key.

13. The system of claim 12, wherein the at least one key is one of a public key infrastructure, private key or a limited use derived key.

14. The system of claim 12, wherein the third party system includes a key store having copies of the at least one key of the first party system.

15. The system of claim 14, wherein the copies of the first party system keys are both derived keys from a common master key.

16. A computer-implemented method for multi-party authentication for a purchase transaction, comprising:

receiving, at a user interface of a user device, a challenge from a merchant system upon initiating a purchase transaction between a user of the user device and a merchant operating the merchant system, wherein the user device stores a wallet application;
storing, by the wallet application of the user device, a payment instrument for a payment transaction;
encrypting the challenge at a cryptographic module of a wallet application or wallet application backend associated with the user device to generate a message authentication code (MAC);
providing, by the user device, the challenge and the MAC to the merchant system;
confirming, at the merchant system, that the challenge received from the user device matches the challenge sent to the user device from the merchant system;
responsive to confirming that the challenge received from the user device matches the challenge sent to the user device, sending the challenge, the MAC, and transaction details associated with the purchase transaction from the merchant system to a processor;
at the processor, decrypting the MAC to generate a decrypted challenge;
confirming, at the processor, that the decrypted challenge matches the challenge;
based on the confirming that the decrypted challenge matches the challenge, selecting the payment instrument on the wallet application;
responsive to confirming that the decrypted challenge matches the challenge, retrieving a personal account number (PAN) of the payment instrument of the user from a database and adding the PAN to the transaction details; and
sending the transaction details from the processor to an issuer of the payment instrument for approval of the purchase transaction.

17. The computer-implemented method of claim 16, wherein receiving, at the user interface of the user device, the challenge from the merchant system includes receiving the challenge at a merchant page displayed at the user interface.

18. The computer-implemented method of claim 17, wherein providing, by the user device, the challenge and the MAC to the merchant system includes providing the challenge and the MAC via data entry boxes of the merchant page displayed at the user interface.

19. The computer-implemented method of claim 16, wherein sending the challenge, the MAC, and the transaction details associated with the purchase transaction from the merchant system to the processor includes sending the transaction details from the merchant system to the processor without the PAN of the payment instrument.

20. The computer-implemented method of claim 16, wherein encrypting the challenge at the cryptographic module of the wallet application or the wallet application backend includes encrypting the challenge and a portion of the PAN appended to the challenge to generate the MAC.

* * * * *